United States Patent

Bronicki et al.

[11] Patent Number: 5,816,048
[45] Date of Patent: Oct. 6, 1998

[54] METHOD FOR UTILIZING ACIDIC GEOTHERMAL FLUID FOR GENERATING POWER IN A RANKINE CYCLE POWER PLANT

[76] Inventors: Lucien Y. Bronicki, 5 Brosh Street, Yavne; Uri Kaplan, Moshav Galia, Doar Na Emek Sorek 76885; Moshe Grassiani, 1/47 Moliver St., Herzlyia, all of Israel

[21] Appl. No.: 403,262

[22] Filed: Mar. 13, 1995

[51] Int. Cl.$^6$ .................................................. F03G 7/00
[52] U.S. Cl. .......................... 60/641.5; 60/651; 60/655
[58] Field of Search .......................... 60/655, 651, 671, 60/641.2, 641.5

[56] References Cited

U.S. PATENT DOCUMENTS

| | | | |
|---|---|---|---|
| 3,845,627 | 11/1974 | Hutchinson | 60/655 |
| 3,862,545 | 1/1975 | Ellis et al. | 60/641 |
| 4,057,964 | 11/1977 | Hurtchinson | 60/641 |
| 4,132,075 | 1/1979 | Fleck et al. | 60/641 |
| 4,291,538 | 9/1981 | Husain et al. | 60/661 |
| 4,319,895 | 3/1982 | Kemmer | 60/454 |
| 4,542,625 | 9/1985 | Bronicki | 60/641.2 |
| 4,996,846 | 3/1991 | Bronicki | 60/641.2 |
| 5,038,567 | 8/1991 | Mortiz | 60/641.5 |
| 5,440,882 | 8/1995 | Kalina | 060/651 |
| 5,483,797 | 1/1996 | Rigal et al. | 60/641.2 |
| 5,598,706 | 2/1997 | Bronicki et al. | 60/641.2 |

OTHER PUBLICATIONS

Geothermal Resource Permit Application Amendment for the Puna Geothermal Venture Project, Dec. 1988.
Optimisation of Geothermal Power Plant by Use of Freon Vapour Cycle, 1969.

*Primary Examiner*—Ira S. Lazarus
*Assistant Examiner*—Alfred Basichas
*Attorney, Agent, or Firm*—Donald M. Sandler

[57] ABSTRACT

A method for utilizing acidic geothermal fluid (e.g., fluid having a pH of less than about 3.5) containing non-condensable gases in a geothermal power plant includes separating the geothermal fluid into steam and brine, applying the steam to a device from which power and steam condensate is produced. Such device can be a back-pressure steam turbine whose exhaust can be cooled by organic fluid to produce organic vapor that is expanded in an organic vapor turbine. Alternatively, the steam can be applied to the steam-side of an indirect contact heat exchanger containing a liquid organic working fluid for producing steam condensate and vaporized working fluid. In such case, the steam condensate produced by the heat exchanger is less acidic than the brine. The vaporized working fluid is expanded in an organic vapor turbine for producing electricity and expanded working fluid, and the expanded working fluid is condensed for producing condensed organic fluid which is preheated and supplied to the heat exchanger. Preheating of the condensed organic fluid is achieved using heat contained in both the steam condensate and brine which are cooled thereby. The dilution of the brine by the steam condensate causes the concentration of acids, e.g., hydrochloric acid, and salts in the brine, to return to less than their original values in the geothermal brine.

15 Claims, 2 Drawing Sheets

METHOD FOR UTILIZING ACIDIC GEOTHERMAL FLUID FOR GENERATING POWER IN A RANKINE CYCLE POWER PLANT

TECHNICAL FIELD

This invention relates to a method for using acidic geothermal fluid for generating power in a Rankine cycle power plant.

BACKGROUND ART

A widely used design for power plants operating on geothermal fluid involves separating the geothermal fluid into steam and brine components, and using the steam to drive a steam turbine and produce electricity. The steam condensate and the brine are conventionally disposed of in a re-injection well to provide an environmentally safe power plant. This design is acceptable, and cost effective in many locations in the world where the pH of the geothermal; fluid is only slightly acidic (e.g., pH=5), or even slightly basic (e.g., pH=9) because conventional materials used in the required separators, steam turbines, and condensers as well as in the piping, can withstand fluids having these characteristics without excessive maintenance.

However, when the geothermal fluid is highly acidic, e.g., with a pH less than about 3.5, steam turbines in particular, constructed of conventional materials, are incapable of long-term operation without extensive maintenance. Therefore, the construction of such a power plant would be very expensive when the available geothermal fluid is highly acidic unless the material of the various heat exchangers as well as the turbine were of special material, such as titanium.

It is an object of the present invention to provide a method for using a power plant under the condition that the geothermal fluid is highly acidic.

DISCLOSURE OF THE INVENTION

The present invention is directed to a method for utilizing acidic geothermal fluid (e.g., fluid having a pH of less than about 3.5) containing non-condensable gases in a geothermal power plant, and includes separating the geothermal fluid into steam and brine, applying the steam to a device from which power and steam condensate are produced. Such a device can be a back-pressure steam turbine whose exhaust steam can be cooled by organic fluid to produce organic vapor that is expanded in an organic vapor turbine in an organic Rankine cycle. In another such device, the steam can be applied to the steam-side of an indirect contact heat exchanger containing a liquid organic working fluid for producing steam condensate and vaporized working fluid. In such case, the steam condensate produced by the heat exchanger will be less acidic than the brine. The vaporized working fluid is expanded in an organic vapor turbine for producing electricity and expanded working fluid, and the expanded working fluid is condensed for producing condensed organic fluid which is preheated and supplied to the heat exchanger. Preheating of the condensed organic fluid is achieved using heat contained in both the steam condensate and brine which are cooled thereby. The dilution of the brine by the steam condensate causes the concentration of acids, e.g., hydrochloric acid, and salts in the brine to return to their original values in the geothermal fluid.

The pH of the brine can be controlled, for example, by the addition of caustic soda, or other suitable pH-raising chemical, for controlling the rate of corrosion of the disposal piping, and the re-injection well casing. In case the pH of the separated brine is much less than 3.5, and in case dilution by the steam condensate is not sufficient to raise the pH to a value of about 3.5, caustic soda or other suitable pH-raising chemicals can be added to the geothermal fluid in amounts that will meet practical corrosion allowance levels for the piping and well casing, and on the other hand to avoid excessive scaling.

BRIEF DESCRIPTION OF DRAWINGS

An embodiment of the invention is described by way of example with reference to the accompanying drawings wherein.

DETAILED DESCRIPTION

Figure 1:
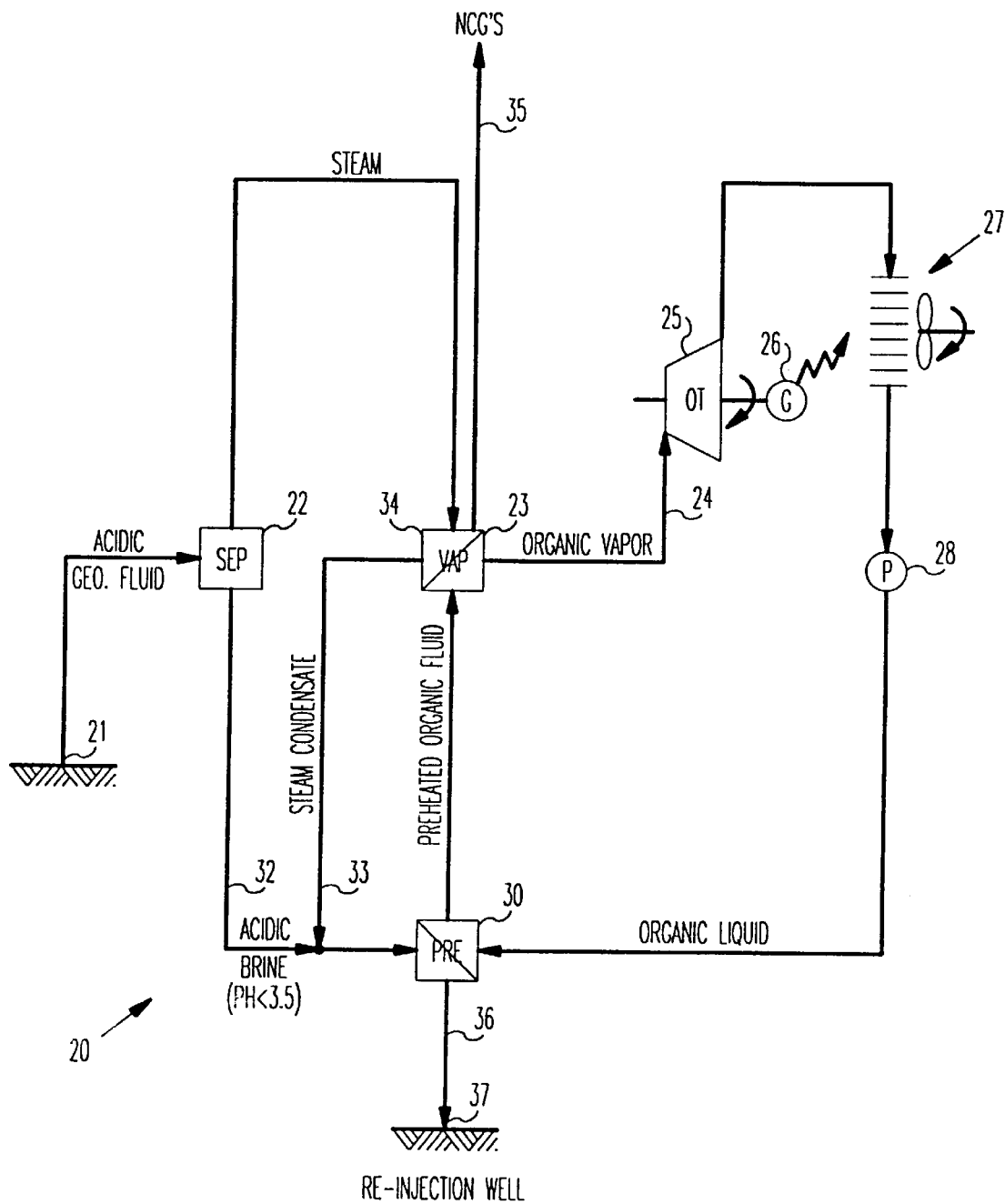
FIG. 1 is a a block diagram of one embodiment of the present invention.

A power plant according to the present invention is designated by reference numeral 20 in FIG. 1 to which reference is now made. Power plant 20 is used in conjunction with geothermal production well 21 that produces a two-phase fluid such as water dominated geothermal fluid comprising steam and brine. The mixture of brine and steam is applied to separator 22 where the steam is separated from the brine, the steam being applied to vaporizer 23 containing a working fluid in the form of an organic fluid such as a n-pentane, iso-pentane, Freon, or other hydrocarbon, which is vaporized. N-pentane is the preferred working fluid.

Conduit 24 supplies vaporized working fluid produced by vaporizer 23 to organic vapor turbine 25 which is effective to expand the vaporized working fluid and convert some of the heat contained therein into useful work by the operation of generator 26 coupled to the turbine. The expanded, heat depleted working fluid exhausted from the turbine is applied to condenser 27. Heat contained in the expanded working fluid is rejected into the air, when an air cooled condenser is involved as shown, or into cooling water, when a cooling water is available and a water cooled condenser is involved. Vapor in the condenser is condensed into liquid working fluid.

Pump 28 receives the liquid working fluid, at essentially the temperature and pressure of the condenser, and pressurizes it for return to the vaporizer via pre-heater 30 to complete the organic Rankine cycle turbine power cycle. Heat for preheating the liquid working fluid is supplied by brine in line 32 produced by separator 22, and by steam condensate in line 33 produced by vaporizer 23.

Non-condensable gases in the geothermal steam that condenses in steam-side 34 of the vaporizer are extracted at 35 and thus do not substantially dissolve in the steam condensate that flows in line 33. These non-condensable gases are disposed of in a suitable manner. The steam condensate produced will be less acidic than the brine; and the mixture of brine and steam condensate that enters the preheater at 35, and exits at 36 as an effluent of the power plant, will be less acidic than the brine alone. This has the advantage of reducing the corrosive nature of the mixture entering preheater 30 and of the effluent on the piping that constitutes line 36 which carries the effluent to re-injection well 37. Even so, by using such a mixture of steam condensate and brine, more heat can be extracted from the mixture. This is because the mixture is still somewhat acidic, and its temperature can be lowered to a relatively low level without the danger of substantial silica precipitation occurring. Thus, by using such methods, more heat in the brine can be made available for power production.

Vaporizer 23 preferably should be constructed from titanium or other corrosive resistant material, such as a stainless steel, coated steel, etc. for maximum resistance to the corrosive effects of the steam on the steam-side of the vaporizer. Preheater 30 likewise is preferably constructed of titanium, or other corrosive resistant material. Preferably, the preheater is a plate-type heat exchanger rather than a shell-and-tube type. However, if necessary and preferred, caustic soda or other suitable pH raising chemicals can be added to the geothermal fluid, brine, and/or steam, or steam condensate, in order that a suitable pH is achieved for the brine, and/or steam, or steam condensate.

Figure 2:
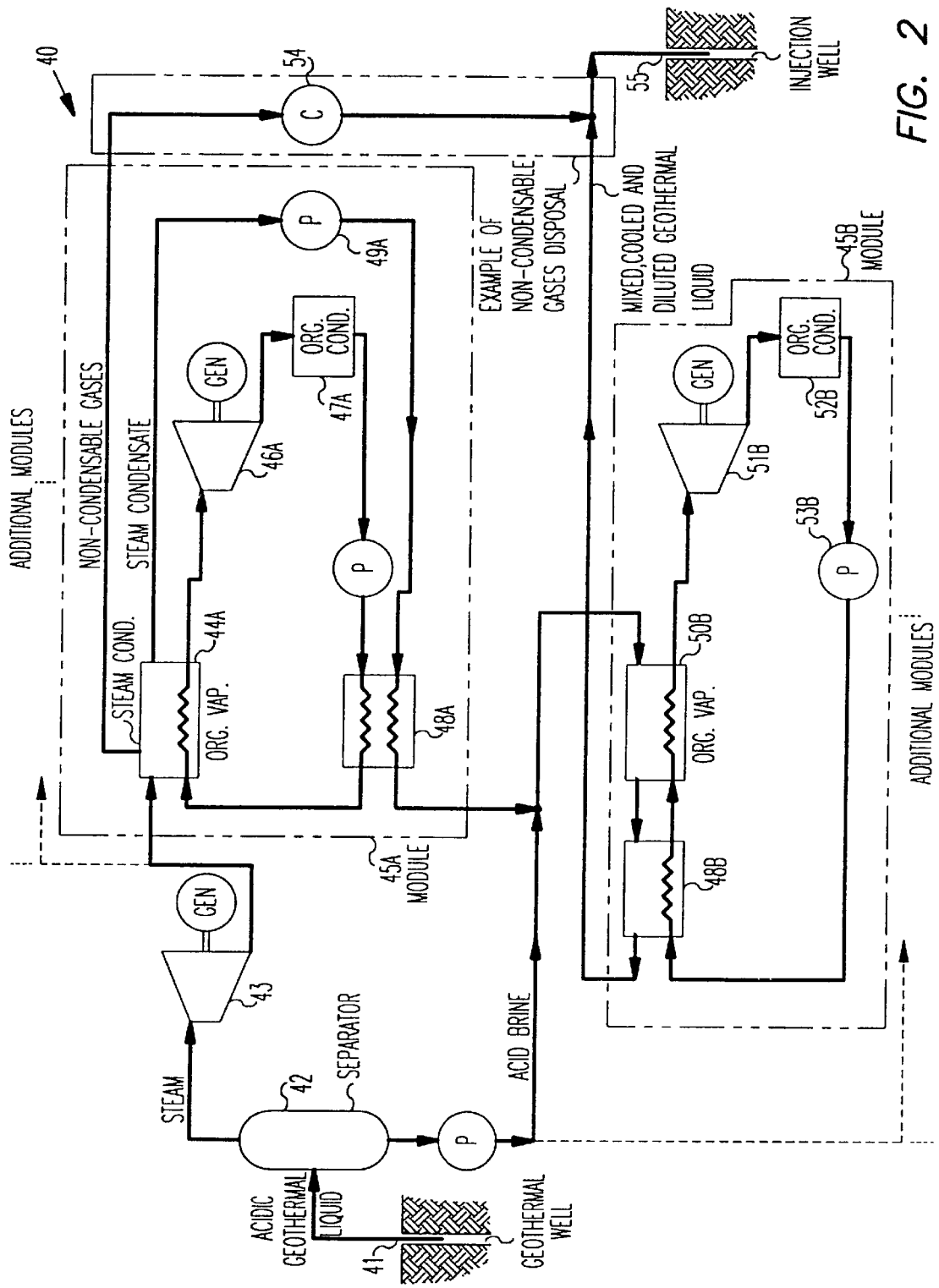
FIG. 2 is a block diagram of a second embodiment of the present invention.

A further embodiment of a power plant according to the present invention is designated by reference numeral 40 in FIG. 2 to which reference is now made. Power plant 40 for producing power from acidic geothermal fluid, containing non-condensable gases, is used in conjunction with production well 41 that produces acidic geothermal fluid originating from an underground geothermal fluid resource (not shown). The geothermal fluid extracted from well 41 is separated in separator 42 into steam containing non-condensable gases, and geothermal liquid or brine at a nominal pressure. The steam is supplied to steam turbine 43 for producing power; and lower pressure steam is exhausted from the steam turbine after power has been produced and supplied to steam condenser 44A which preferably operates at a pressure above atmospheric pressure and which is part of module 45A. Steam condenser 44A is cooled by organic fluid and produces organic fluid vapor and steam condensate, with the non-condensable gases being extracted from the condensable vapors preferably at above atmospheric pressure. Organic fluid vapor is supplied to organic turbine 46A for producing power; and lower pressure organic fluid vapor is exhausted from the organic turbine after power has been produced.

The lower pressure organic fluid vapor exhausted from the turbine is supplied to organic fluid condenser 47A, which is preferably air cooled, where the vapor condenses and forms organic fluid condensate which is supplied to preheater 48A. In preheater 48A, steam condensate supplied to the preheater by pump 49A transfers heat contained therein to the organic fluid condensate and produces heated organic fluid liquid and cooled steam condensate. The heated organic fluid liquid is then returned to steam condenser 44A thus completing the organic Rankine cycle turbine power cycle in module 48A.

Acidic geothermal liquid, or brine, separated from the steam by separator 42 is supplied to module 45B for heat utilization and production of power. Specifically, the separated acidic geothermal brine is supplied to vaporizer 50B where heat is transferred to organic fluid liquid previously preheated in preheater 48B. Vaporizer 50B produces organic fluid vapor and heat depleted geothermal brine which is supplied to preheater 48B wherein the heat depleted geothermal brine transfers heat to organic fluid condensate and produces preheated organic fluid liquid which is supplied to vaporizer 50B. The cooled geothermal brine produced by preheater 48B is disposed of in re-injection well 55. The organic fluid vapor produced by vaporizer 48B is supplied to organic turbine 51B which produces power and lower pressure organic fluid vapor that is exhausted from the turbine after power has been produced. The lower pressure organic vapor exhausted from the turbine after power has been produced is supplied to organic fluid vapor condenser 52B, which preferably is air cooled, and produces organic fluid vapor condensate supplied by pump 53B to preheater 48B completing the organic Rankine cycle turbine power cycle for module 45B.

Cooled steam condensate exiting preheater 48A present in module 45A is added to the geothermal brine produced by separator 42 thus producing mixed, and diluted geothermal brine that enters vaporizer 50B in module 45B. Non-condensable gases extracted from steam condenser 44A in module 45A are disposed of, e.g., by compressing them using compressor 54 to at least the pressure of the mixed, cooled and diluted geothermal brine, and by introducing the compressed gases into the mixed, cooled and diluted geothermal brine that exits preheater 48B of module 45B. The resultant effluent produced when the compressed gases are introduced into the cooled and diluted geothermal brine, then can be injected into re-injection well 55. Also here, the working fluid of the organic Rankine cycle turbine power cycle in modules 45A and 45B are in the form of an organic fluid such as n-pentane, iso-pentane, Freon, or other hydrocarbon. N-pentane is the preferred working fluid.

By adding the steam condensate to the separated acidic brine before it is applied to vaporizer 50B, the concentration of acids, such as hydrochloric acid, and salts is returned to their original values in the geothermal fluid produced by well 41. This has the advantage, in this embodiment also, of reducing the corrosive nature of the mixture entering vaporizer 50B and of the effluent on the piping which carries the effluent to re-injection well 55. Even so, by using such a mixture of steam condensate and brine, more heat can be extracted from the mixture. This is because the mixture is still somewhat acidic, and its temperature can be lowered to a relatively low level without the danger of substantial silica precipitation occurring.

Furthermore, the pH of the brine can be controlled, e.g., by the addition of caustic soda f, or other suitable pH-raising chemicals, for controlling the corrosion rate of the brine-disposal piping and re-injection well casing. In case the pH of the separated brine is much less than 3.5, and in case dilution by the steam condensate is not sufficient to raise the pH to the value of about 3.5, caustic soda or other suitable pH raising chemicals can be added to the geothermal fluid in such a manner in order to meet practical corrosion allowance levels for the piping or the well casing, and on the other hand to avoid excessive scaling. Thus, in this embodiment also, by using such methods, more heat in the brine can be made available for power production.

Again, in this embodiment also, vaporizer 50B preferably should be constructed from titanium or other corrosive resistant material, such as a stainless steel, coated steel, etc. for maximum resistance to the corrosive effects of the acidic brine on the vaporizer. Preheater 48B likewise is preferably constructed of titanium, or other corrosive resistant material. Preferably, the preheater is a plate-type heat exchanger rather than a shell-and-tube type. However, in this embodiment also, if necessary and preferred, means for raising the pH, such as the addition of caustic soda or other pH-raising chemicals, etc., can be used for increasing the pH of the geothermal fluid, brine, and/or steam, or steam condensate in order to achieve a suitable pH for the brine, and/or steam, or steam condensate.

The advantages and improved results furnished by the method and apparatus of the present invention are apparent from the foregoing description of the preferred embodiment of the invention. Various changes and modifications may be

We claim:

1. A method for utilizing acidic geothermal fluid containing non-condensable gases, in a geothermal power plant, said method comprising:
   a) using a separator for separating the geothermal fluid into steam and brine;
   b) applying said steam from said separator directly to the steam-side of an indirect contact heat exchanger containing a liquid organic working fluid for producing steam condensate that is less acidic than said brine, and non-condensable gases, and for producing vaporized working fluid;
   c) extracting said non-condensable gases from the steam-side of said heat exchanger;
   d) expanding said vaporized working fluid in an organic vapor turbine for producing electricity and expanded working fluid;
   e) condensing said expanded working fluid in a condenser for producing condensed organic fluid;
   f) combining said brine directly from said separator with said steam condensate from said indirect contact heat exchanger to form a combined stream;
   g) preheating said conensed organic fluid in a preheater using heat contained in said combined stream; and
   h) supplying the preheated condensed working fluid to said heat exchanger.

2. A method according to claim 1 including disposing of said cooled brine and steam condensate in a re-injection well.

3. A method according to claim 1 including adding a pH-raising chemical to said geothermal fluid to increase its pH.

4. A method according to claim 1 including cooling said condenser with air.

5. A method according to claim 1 wherein the step of preheating said condensed organic fluid using heat contained in said steam condensate and brine is carried out by supplying the steam condensate and brine to an organic fluid preheater constructed from corrosion resistant material.

6. A method according to claim 5 wherein the step of preheating said condensed organic fluid using heat contained in said steam condensate and brine is carried out by supplying the steam condensate and brine to an organic fluid preheater constructed from titanium.

7. A method for utilizing acidic geothermal fluid containing non-condensable gases that include carbon dioxide said method comprising:
   a) separating the geothermal fluid into steam and acidic brine;
   b) expanding said steam for producing power and expanded steam;
   c) condensing said expanded steam in a steam condenser using an organic fluid for and producing steam condensate and vaporized organic fluid, and extracting non-condensable gases from said steam condenser;
   d) expanding said vaporized organic fluid for producing power and lower pressure organic fluid vapor, condensing said lower pressure organic fluid vapor for producing organic fluid condensate, preheating said organic fluid condensate and preheated organic fluid, and supplying the preheated organic fluid to said steam condenser;
   e) combining said cooled steam condensate with said acidic brine for producing diluted acidic brine;
   f) supplying said diluted acidic brine to a heat exchange containing additional organic fluid for producing additional organic fluid vapor and heat depleted diluted acidic brine;
   g) expanded said additional organic fluid vapor for producing power and expanded additional organic fluid vapor;
   h) condensing said expanded additional organic fluid vapor for producing additional organic fluid condensate;
   i) supplying said additional organic fluid condensate to said heat exchanger; and
   j) introducing the compressed non-condenseable gases into said heat deplete diluted acidic for forming geothermal liquid effluent; and
   k) disposing of said effluent in a re-jection well.

8. A method according to claim 7 wherein said expanded additional organic fluid vapor is condensed in an air-cooled condenser.

9. A method according to claim 7 including preheating said additional organic fluid condensate prior to supplying it to said heat exchanger with said heat depleted diluted acidic brine for producing preheated additional organic fluid liquid which is supplied to said heat exchanger, and cooled heat depleted diluted acidic brine which is disposed of in said re-injection well.

10. A method according to claim 7 including adding a pH-raising chemical to said geothermal fluid to increase its pH.

11. A method according to claim 9 including adding a pH-raising chemical to said geothermal fluid to increase its pH.

12. A method according to claim 7 wherein the step of supplying said diluted acidic brine to a heat exchanger for producing organic fluid vapor, and heat depleted diluted acidic brine, is carried out by supplying the diluted acidic brine to a heat exchanger constructed from corrosion resistant material.

13. A method according to claim 12 wherein the step of supplying said diluted acidic brine to a heat exchanger for producing organic fluid vapor, and heat depleted diluted acidic brine, is carried out by supplying the diluted acidic brine to a heat exchanger constructed from titanium.

14. A method according to claim 9 wherein the step of preheating said organic fluid condensate, prior to supplying it to said heat exchanger, with said heat depleted diluted acidic brine, is carried out by supplying the heat depleted diluted acidic brine to an organic fluid preheater constructed from corrosion resistant material.

15. A method according to claim 14 wherein the step of preheating said organic fluid condensate, prior to supplying it to heat exchanger, with said heat depleted diluted acidic brine, is carried out by supplying the heat depleted diluted acidic brine to an organic fluid preheater constructed from titanium.

* * * * *